July 5, 1927.

A. W. TAYLOR

LINE PULLEY

Filed June 22, 1926

1,635,145

WITNESSES

INVENTOR
Albert W. Taylor,
BY
ATTORNEYS

Patented July 5, 1927.

1,635,145

UNITED STATES PATENT OFFICE.

ALBERT WATKINS TAYLOR, OF PECKVILLE, PENNSYLVANIA.

LINE PULLEY.

Application filed June 22, 1926. Serial No. 117,801.

This invention relates to a clothes line pulley and has for its object the provision of a device formed of rust-proof materials and so protected from the weather that the pulley will be ready for use at all times.

A further object of the invention is the provision of a pulley mounted in a housing with a cover secured to said housing by a bolt which forms the spindle for the pulley.

This invention will be best understood from a consideration of the following detailed description, in view of the accompanying drawing forming a part of the specification; nevertheless it is to be understood that the invention is not confined to the disclosure, being susceptible of such changes and modifications which shall define no material departure from the salient features of the invention as expressed in the appended claims.

Figure 1:
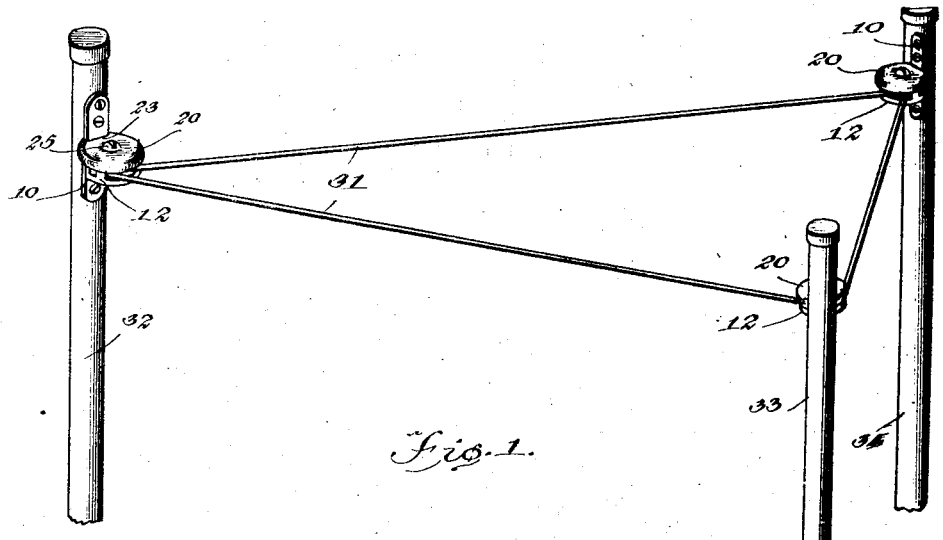
Figure 1 is a view in perspective showing my improved pulley in operative position for supporting a clothes line.
Figure 2:
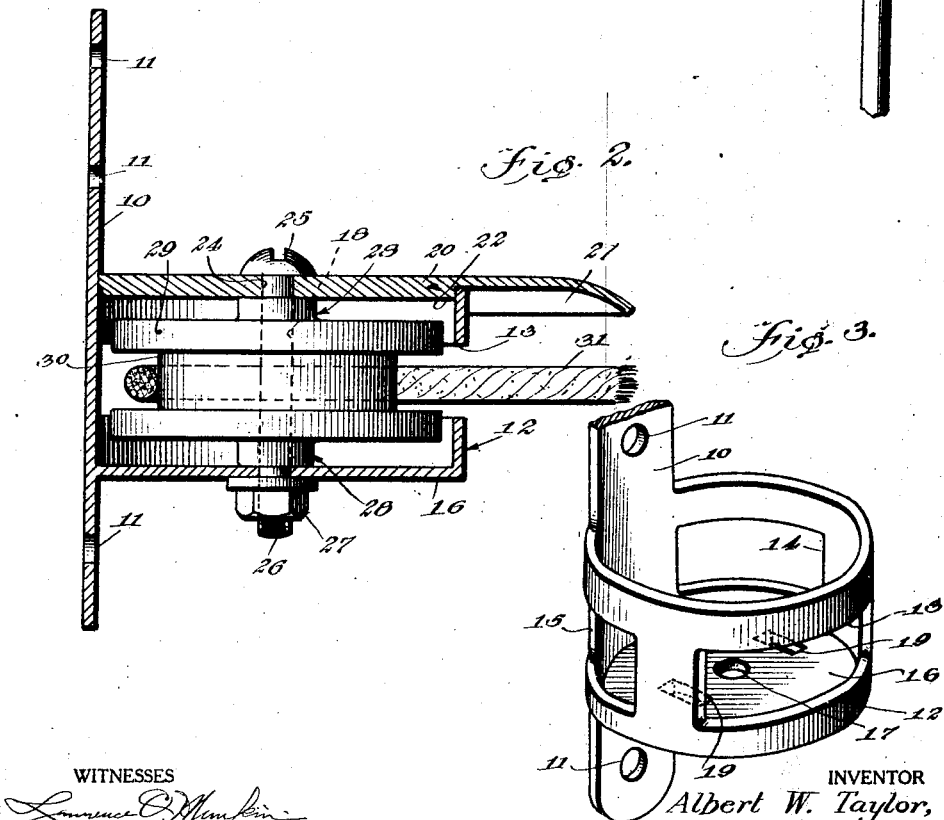
Figure 2 is a vertical section of my pulley.
Figure 3:
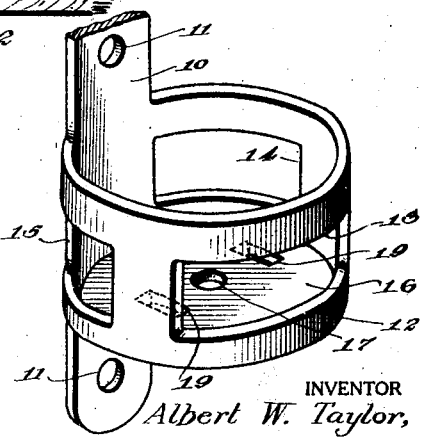
Figure 3 is a view in perspective of the housing for the pulley.

Referring more particularly to the drawings, 10 designates a securing plate having perforations 11 to receive screws or nails. A cylindrically shaped wall 12 is formed integrally with the plate 10 and said plate is curved transversely to conform to the circumference of the wall of which the plate forms a part.

The wall is provided with elongated arcuately shaped slots 13, 14 and 15. A base member 16 is formed integrally with the wall 12 and the curved securing plate 10. A central perforation 17 in the base forms a bearing for one end of a spindle bolt 18. A pair of passages 19 are cut in the base to provide discharge ports for moisture which may find its way into the housing just described.

A convexed cover plate 20 has an overhang or water shed 21 projecting beyond the wall 12. The shed is of less thickness than the cover proper so that an annular shoulder 22 is formed which fits snugly within the upper end of the circular wall 12. The shed 21 is cut away at 23 to form a notch to receive the securing plate 10. The plate 20 has a central perforation 24 to provide a bearing for the upper end of the spindle bolt 18.

The spindle has a slotted head 25 resting on the cover 20 and a lower threaded end 26 engaged by a nut 27 located below the base. Washers 28 are disposed upon the bolt 18 upon opposite faces of a pulley 29 having a cable groove 30 to receive a clothesline 31.

The plates 10 of the housings are secured to posts 32, 33 and 34 adjacent their upper ends and the continuous line 31 is supported by the grooves 30 of the pulleys 29, with the line passing through the front slot 13.

All of the parts of the pulley and housing are made of some rust-proof material such as aluminum so that exposure to the elements will not injure the parts.

I claim:

1. A line support comprising a cylindrical housing having a wall provided with a plurality of arcuately shaped slots, a base member formed integrally with the wall, a securing plate integral with and forming part of the wall, said plate projecting beyond said wall, a convexed cover plate for the housing having a water shed projecting beyond the wall and a shoulder snugly engaging the inner face of the wall, said base and cover having alined perforations, a spindle bolt mounted in the perforations and securing the cover to said housing and a pulley in the housing mounted on the bolt, said water shed having a notch to receive the securing plate.

2. A line support comprising a cylindrical housing having a wall provided with a plurality of arcuately shaped slots, a base member, a securing plate forming part of the wall, said plate projecting beyond said wall, a convexed cover plate for the housing having a water shed projecting beyond the wall, said base and cover having alined perforations, a spindle bolt mounted in the perforations and securing the cover to said housing and a pulley in the housing mounted on the bolt.

ALBERT WATKINS TAYLOR.